United States Patent
Wang et al.

(10) Patent No.: US 8,385,059 B2
(45) Date of Patent: Feb. 26, 2013

(54) MULTI-DISPLAYS ELECTRONIC BOOK HAVING A RETRACTABLE DISPLAY

(75) Inventors: Tzu-Ming Wang, Fongshan (TW); Kai-Cheng Chuang, Tainan (TW)

(73) Assignee: E Ink Holdings Inc., Hsinchu (TW)

( * ) Notice: Subject to any disclaimer, the term of this patent is extended or adjusted under 35 U.S.C. 154(b) by 250 days.

(21) Appl. No.: 12/849,003

(22) Filed: Aug. 2, 2010

(65) Prior Publication Data
US 2012/0026664 A1    Feb. 2, 2012

(51) Int. Cl.
*H05K 5/00*  (2006.01)
*H05K 7/00*  (2006.01)

(52) U.S. Cl. ......... 361/679.21; 361/679.22; 361/679.26; 361/679.3

(58) Field of Classification Search ............ 361/679.21, 361/679.22, 679.26, 679.3
See application file for complete search history.

(56) References Cited

U.S. PATENT DOCUMENTS

| | | | |
|---|---|---|---|
| 7,440,265 B2* | 10/2008 | Ou Yang ................. 361/679.27 |
| 7,558,057 B1* | 7/2009 | Naksen et al. ........... 361/679.56 |
| 7,667,962 B2* | 2/2010 | Mullen ..................... 361/679.56 |
| 2006/0034039 A1* | 2/2006 | Van Rens ....................... 361/681 |
| 2008/0284934 A1* | 11/2008 | Umezaki et al. ................. 349/43 |

\* cited by examiner

*Primary Examiner* — Anthony Haughton
(74) *Attorney, Agent, or Firm* — Guice Patents PLLC

(57) ABSTRACT

A multi-displays electronic book having a retractable display, including a first display; a reel device, installed at one side of the first display, having a rotatable axle; and a flexible second display, having a first side and a second side opposing to each other, the first side being fixed at the rotatable axle, and the second side providing a force application end for spreading the flexible second display on the first display.

8 Claims, 5 Drawing Sheets

MULTI-DISPLAYS ELECTRONIC BOOK HAVING A RETRACTABLE DISPLAY

BACKGROUND OF THE INVENTION

1. Field of the Invention

The present invention relates to an electronic book, especially to a multi-displays electronic book having a retractable display.

2. Description of the Related Art

With the development of electronic books, one can refer to specific motion pictures while reading text contents on a display. To implement this function, the response time of the display has to be short enough. Of the common seen displays, the electronic paper display, characterized in low power dissipation though, can show only static text contents but not motion pictures due to its slow display response—the response time of a general electronic paper display is around and above 200 ms; and the LCD (Liquid Crystal Display) has fast enough display response for showing motion pictures, but its power consumption is much higher than that of the electronic paper display. That is, although the LCD can simultaneously display static text contents and motion pictures, its power consumption in showing static text contents is much higher than the electronic paper display's.

To simultaneously meet the needs of power saving and providing users with the function of referring to specific motion pictures while reading text contents on a display, the present invention proposes a novel display architecture.

SUMMARY OF THE INVENTION

One objective of the present invention is to disclose a multi-displays electronic book having a retractable display, which has a retractable electronic paper display installed on a LCD to provide a function of adjusting a static display area and a dynamic display area according to the need of a user.

Another objective of the present invention is to disclose a multi-displays electronic book having a retractable display, which has a retractable electronic paper display installed on a LCD to have static contents displayed on the electronic paper display and motion pictures displayed on the LCD to optimize the power consumption of the electronic book.

To accomplish the foregoing objectives, a multi-displays electronic book having a retractable display is proposed. The multi-displays electronic book includes a LCD, a reel device, and a flexible electronic paper display, wherein the LCD has at least one first conductive contact along its edges; the reel device, installed at one side of the LCD, having a rotatable axle, a rewind means, and a rewind prohibiting means, wherein the rewind means is used to make the axle rotate in a reversed rotational direction, and the rewind prohibiting means is used to be activated to prohibit the axle from rotating in the reversed rotational direction when the axle is held at a positioning angle thereof; and the flexible electronic paper display has a first side and a second side opposing to each other, the first side being fixed at the rotatable axle, and the second side having a handle and a second conductive contact, wherein the handle is used to provide a force application end for spreading the flexible electronic paper display on the LCD, and the second conductive contact is used to electrically connect with the at least one first conductive contact during the spreading of the flexible electronic paper display.

A control unit is installed in the LCD, and it includes: a display areas dividing signal generation device, used for detecting the electric connection of the at least one first conductive contact and the second conductive contact to generate a display areas dividing signal; and a control unit, used for defining a first display area and a second display area according to the display areas dividing signal, outputting first display data, which complies with the response time spec of the first display area, to the LCD, and outputting second display data, which complies with the response time spec of the second display area, via a connection cable, to the flexible electronic paper display.

Thanks to the design mentioned above, the present invention possesses the following functions:

1. The multi-displays electronic book having a retractable display of the present invention can be divided into a static display area and a dynamic display area according to the need of the user, to facilitate the user's referring to motion pictures when reading text contents.
2. The user can define a static display area and a dynamic display area by pulling one side of the flexible electronic paper display to a specific position.
3. The user can make the flexible electronic paper display roll back into a reel device by pulling one side of the flexible electronic paper display to make it leave a specific position and then release it.
4. The present invention can reduce the total power consumption of the electronic book by having text contents displayed on the flexible electronic paper display.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
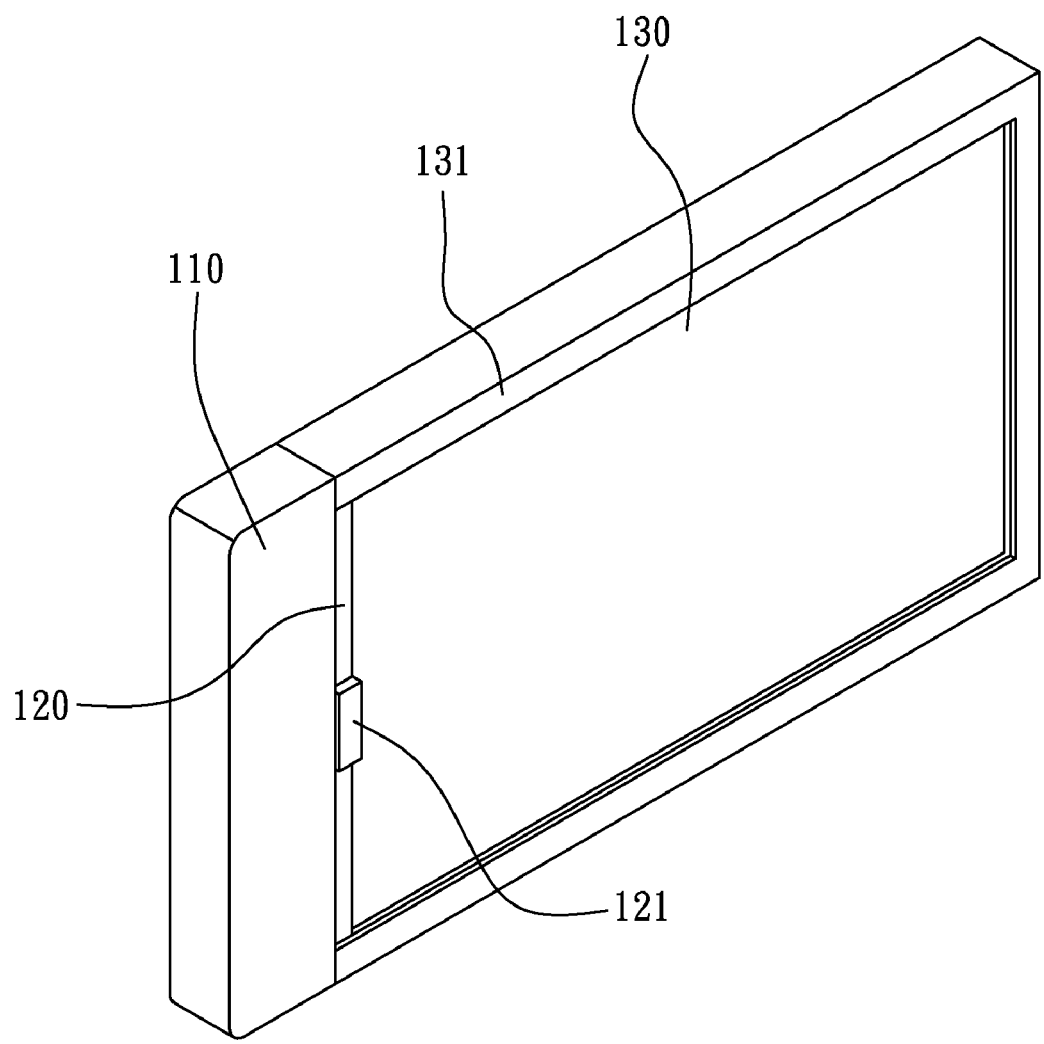
FIG. 1 illustrates the front view of a multi-displays electronic book having a retractable display according to a preferred embodiment of the present invention.

Please refer to FIG. 1, which illustrates the front view of a multi-displays electronic book having a retractable display according to a preferred embodiment of the present invention. As illustrated in FIG. 1, the multi-displays electronic book having a retractable display includes a reel device 110, an electronic paper edge band 120, a handle 121, a LCD 130, and a U-shaped LCD edge band 131.

The reel device 110, installed at one side of the LCD 130, can be an unpowered device or a powered device, having a rotatable axle, a rewind means, and a rewind prohibiting means. A flexible electronic paper display is accommodated inside the reel device 110, wherein one side of the flexible electronic paper display is fixed at the rotatable axle, and the opposing side has the electronic paper edge band 120 and the handle 121 installed thereon. The flexible electronic paper display can be for example but not limited to an electrophoresis display, a cholesteric liquid crystal display, or an OLED (Organic Light Emitting Diode) display.

The rewind means is used to make the axle rotate in a reversed rotational direction to roll the flexible electronic paper display back into the reel device, and the rewind prohibiting means is used to be activated when a user holds the handle 121 at a position corresponding to a positioning angle of the axle, to prohibit the axle from rotating in the reversed rotational direction and thereby fix the flexible electronic paper display with the handle 121 fixed at that position. The reel device 110 can be designed to have a plurality of positioning angles to provide a plurality of positions for fixing the electronic paper display. When a user pulls the handle 121 to one of the positions for fixing the electronic paper display— the axle rotates to one of the positioning angles—and then releases it, the rewind prohibiting device will prohibit the axle from rotating in the reversed rotational direction and thereby fix the handle 121 at that position; when a user pulls the handle 121 to a position other than the positions for fixing the electronic paper display and then releases it, the rewind means will make the axle rotate in a reversed rotational direction to roll the flexible electronic paper display back into the reel device 110.

The handle 121 is installed on the electronic paper edge band 120 to facilitate a user to spread the flexible electronic paper display rightward. Besides, there is one positioning conductive contact installed respectively at the top end and bottom end of the electronic paper edge band 120.

The LCD 130 has a U-shaped edge band 131, wherein a top channel and a bottom channel are formed by a top edge band and a bottom edge band respectively to facilitate the flexible electronic paper display to slide therein. There are sensing conductive contacts installed in the top channel and the bottom channel at the positions for fixing the electronic paper display. The sensing conductive contacts are designed to electrically connect with the positioning conductive contacts during the spreading of the flexible electronic paper display. Besides, the LCD 130 can also be replaced with a MEMS (Micro Electro Mechanical System) display, or an electrowetting display.

The LCD 130 further has a control circuit inside, including a display areas dividing signal generation device and a control unit. The display areas dividing signal generation device, used for detecting the electrical connection of the positioning conductive contact and one of the sensing conductive contacts to generate a display areas dividing signal when the time of the electrical connection exceeds a predetermined value— indicating that the flexible electronic paper display is fixed. The control unit, used for defining a LCD display area and an electronic paper display area according to the display areas dividing signal, and outputting first display data, which complies with the response time spec of the LCD display area, to the LCD 130, and outputting second display data, which complies with the response time spec of the electronic paper display area, via a connection cable, to the flexible electronic paper display. The first display data is preferably a figure data (static or dynamic), and the second display data is preferably a text data.

Figure 2:
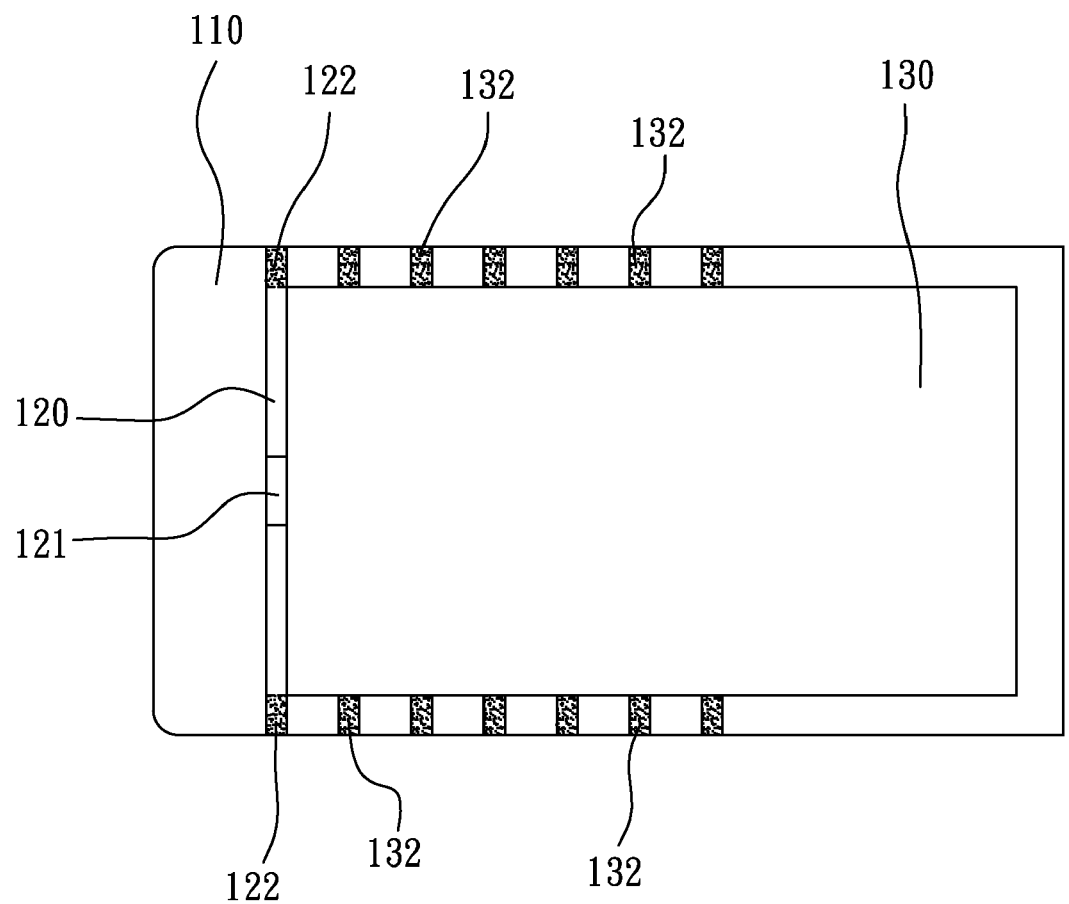
FIG. 2 illustrates the front view of a multi-displays electronic book having a retractable display of FIG. 1 with edge band removed.

A preferred embodiment of the positioning conductive contacts and the sensing conductive contacts is illustrated in FIG. 2, which illustrates the front view of the multi-displays electronic book having a retractable display in FIG. 1 with the edge band 131 removed. As illustrated in FIG. 2, the electronic paper edge band 121 has one positioning conductive contact 122 respectively at its top end and bottom end, and the LCD 130 has a plurality of sensing conductive contacts 132 along both its top side and bottom side.

Figure 3:
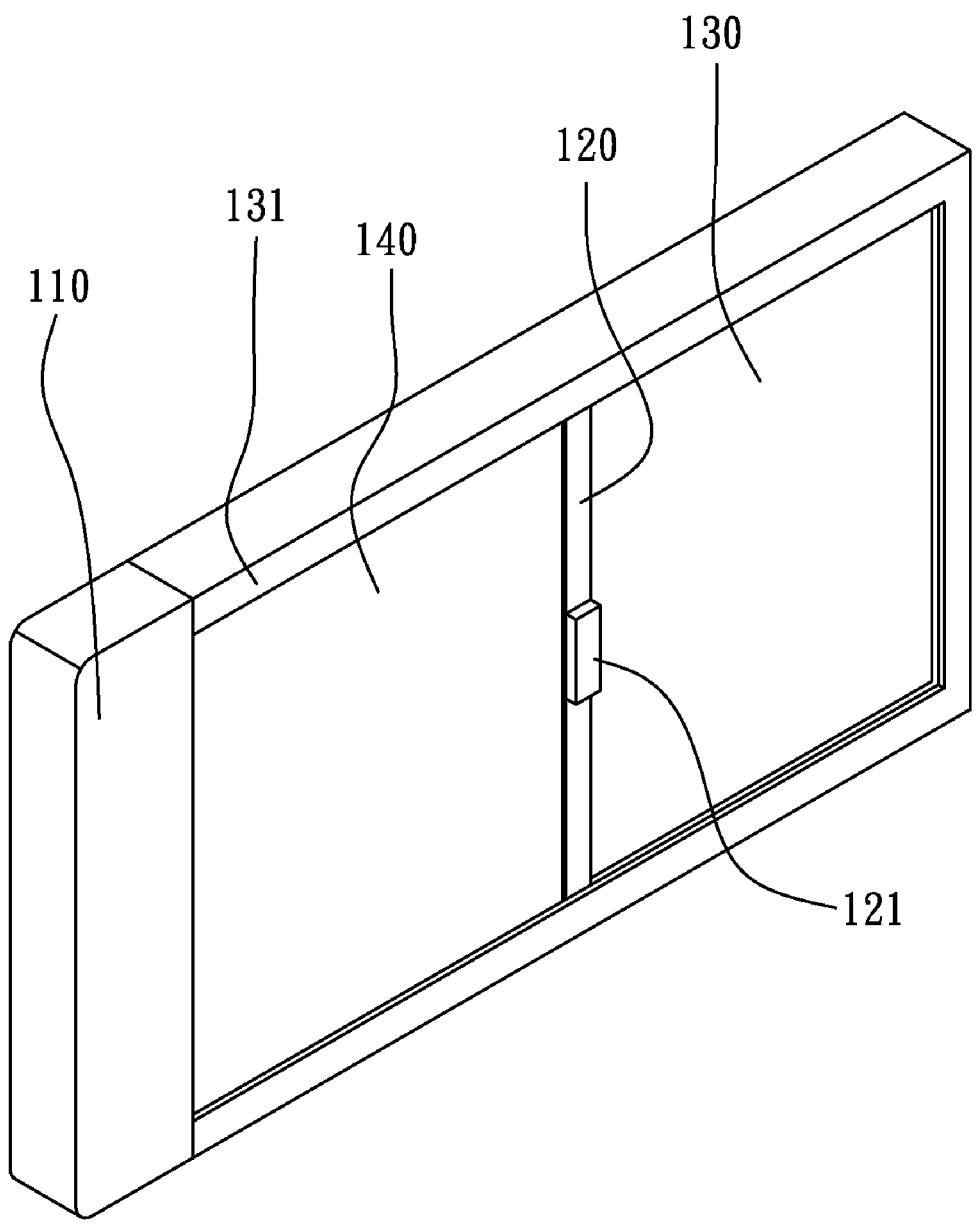
FIG. 3 illustrates the front view of a multi-displays electronic book having a retractable display of FIG. 1 with the electronic paper display spread to a position.

An operation example is illustrated in FIG. 3, which illustrates the front view of the multi-displays electronic book having a retractable display in FIG. 1 with the flexible electronic paper display spread to a position. As illustrated in FIG. 3, an electronic paper display 140 is fixed at a position, and the LCD 130 and the electronic paper display 140 are set to show the first display data and the second display data accordingly.

Figure 4:
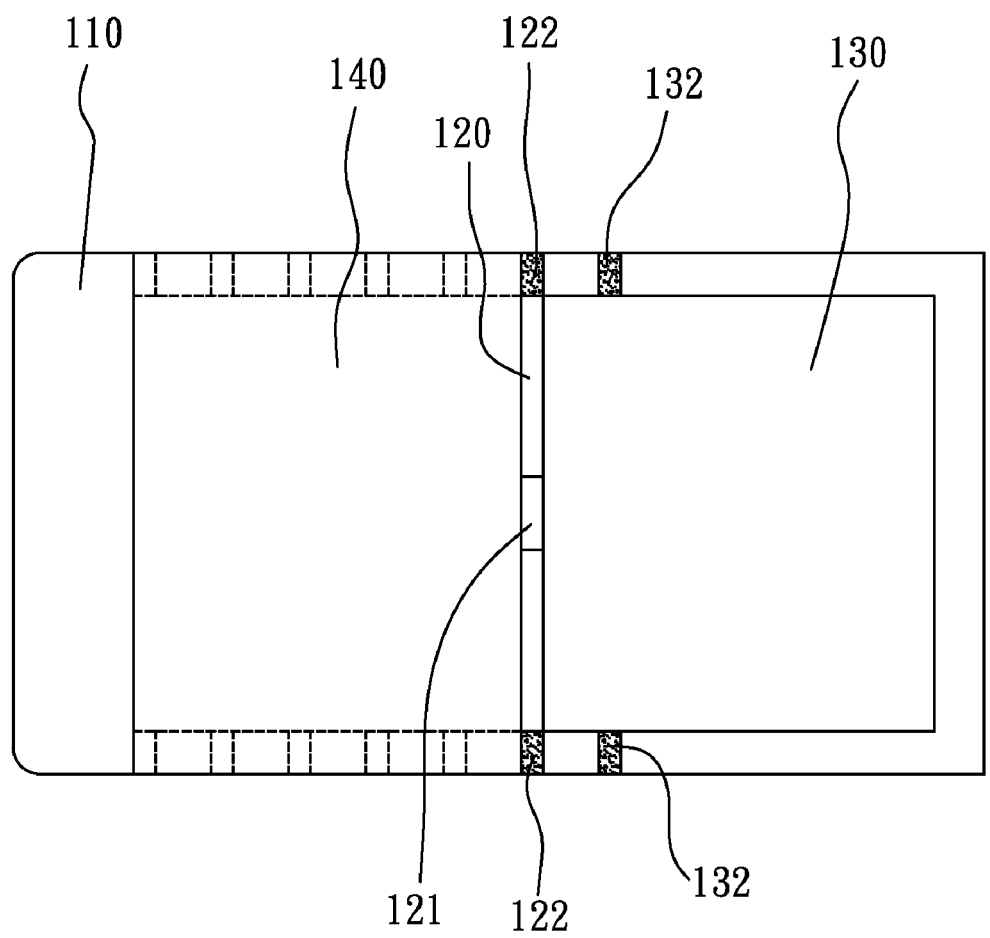
FIG. 4 illustrates the front view of a multi-displays electronic book having a retractable display of FIG. 3 with edge band removed.

FIG. 4 illustrates the front view of the multi-displays electronic book having a retractable display in FIG. 3 with the edge band 131 removed. As illustrated in FIG. 4, the positioning conductive contacts 122 are in electrical connection with the sensing conductive contacts 132 at the second from the right.

Figure 5:
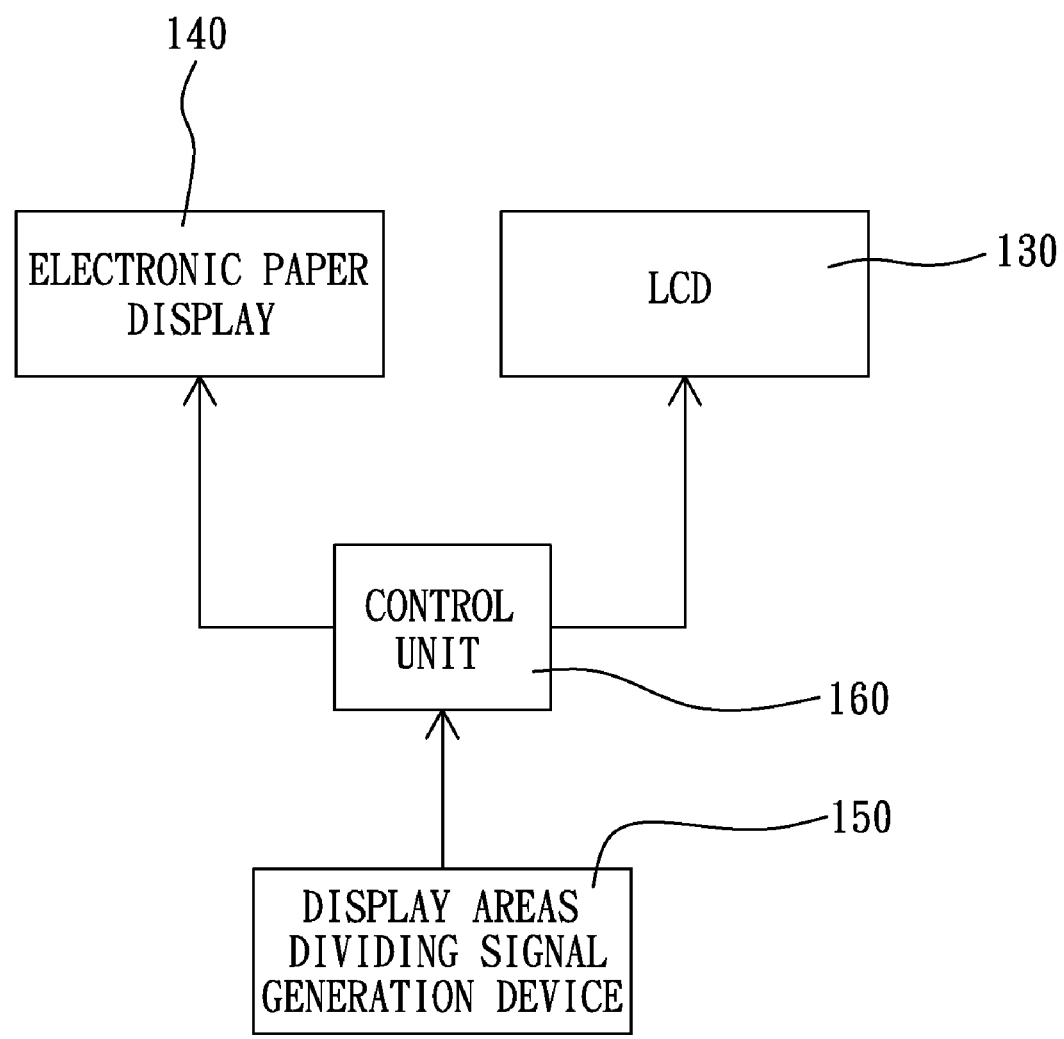
FIG. 5 illustrates the block diagram of a multi-displays electronic book having a retractable display according to a preferred embodiment of the present invention.

In addition, FIG. 5 illustrates the block diagram of a multi-channel electronic book having a retractable display according to a preferred embodiment of the present invention, including a LCD 130, an electronic paper display 140, a display areas dividing signal generation device 150, and a control unit 160.

As illustrated in FIG. 5, the display areas dividing signal generation device 150 is used to detect the electrical connection of the positioning conductive contact 122 with one of the sensing conductive contacts 132, to generate a display areas dividing signal when the time of the electrical connection exceeds a predetermined time (ex., 1 sec)—indicating the flexible electronic paper display 140 is positioned.

The control unit 160, preferably a control circuit including a CPU (Central Processing Unit)—used to execute a software program, is used to define an electronic paper display area and a LCD display area according to the display areas dividing signal, and output first display data complying with the response time spec of the LCD display area to the LCD 130, and output second display data complying with the response time spec of the electronic paper display area, via a connection cable—preferably a flexible printed circuit board—to the flexible electronic paper display 140. The first display data is preferably a figure data (static or dynamic), and the second display data is preferably a text data.

In conclusion, the multi-displays electronic book having a retractable display of the present invention can be configured to provide an electronic paper display area and a LCD display area by pulling a handle of a flexible electronic paper display to a position and then holding it for a while, to facilitate the user's referring to figure pictures (static or dynamic) when reading text contents with lower power consumption.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. For example, the reel device can be relocated to the right side or top side or bottom side of the LCD, or a pair of reel devices can be installed at the left side and the right side or at the top side and the bottom side.

In summation of the above description, the present invention herein enhances the performance over the conventional structure and further complies with the patent application requirements and is submitted to the Patent and Trademark Office for review and granting of the commensurate patent rights.

What is claimed is:

1. A multi-displays electronic book comprising:
   a first display;
   a reel device connected to an end of said first display; and
   a flexible second display being a retractable display and having a first end and a second end located on opposing ends thereof, said flexible second display is movable between a retracted position located in the reel device and an extended position covering said first display;
   wherein said reel device is connected to the first end of said flexible second display, said reel device providing a retracting function and a positioning function to selectively retract and position said flexible second display in a position located between the retracted position and extended position;
   wherein the second end of said flexible second display is used to apply a force and move said flexible second display between the retracted position and extended position;
   wherein said first display has at least one first conductive contact located on opposing edges thereof, and said flexible second display has a second conductive contact located on the second end thereof, said second conductive contact is selectively electrically connected to said at least one first conductive contact when said flexible second display moves between the retracted position and the expanded position.

2. The multi-displays electronic book according to claim 1, wherein said first display is a display selected from a group consisting of a liquid crystal display, a MEMS display, and an electrowetting display.

3. The multi-displays electronic book according to claim 1, wherein said reel device further comprises a rewind device rolling said flexible second display into said reel device.

4. The multi-displays electronic book according to claim 1, wherein said flexible second display comprises a handle located on said second end.

5. The multi-displays electronic book according to claim 1, further comprising a control circuit, said control circuit including:
   a display areas dividing signal generation device detecting the electrical connection of said at least one first conductive contact and said second conductive contact and generating a display areas dividing signal; and
   a control unit defining a first display area and a second display area according to said display areas dividing signal; outputting first display data to said first display, said first display data complying with a response time spec of said first display area; and outputting second display data to said flexible second display via a connection cable, said second display data complying with a response time spec of said second display area.

6. A multi-displays electronic book comprising:
   a first display having at least one first conductive contact along edges thereof;
   a reel device connected to an end of said first display; and
   a flexible second display being a retractable display and having a first end and a second end located on opposing ends thereof, said flexible second display is movable between a retracted position located in the reel device and an extended position covering said first display, the second end of the flexible display has a handle and a second conductive contact, wherein said handle provides a force application end for moving said flexible second display between the extended position and the retracted position on said first display, and said second conductive contact is selectively electrically connected with said at least one first conductive contact when said flexible second display moves between the retracted position and the expanded position;
   wherein said reel device is connected to the first end of said flexible second display, said reel device providing a retracting function and a positioning function to selectively retract and position said flexible second display in a position located between the retracted position and extended position;
   wherein said reel device has a rewind device rolling said flexible second display into said reel device.

7. The multi-displays electronic book according to claim 6, wherein said flexible second display is a display selected from a group consisting of an electrophoresis display, a cholesteric liquid crystal display, and an OLED display.

8. The multi-displays electronic book according to claim 6, further comprising a control circuit, said control circuit including:
   a display areas dividing signal generation device detecting the electrical connection of said at least one first conductive contact and said second conductive contact and generating a display areas dividing signal; and
   a control unit defining a first display area and a second display area according to said display areas dividing signal; outputting first display data to said first display, said first display data complying with a response time spec of said first display area; and outputting second display data to said flexible second display via a connection cable, said second display data complying with a response time spec of said second display area.

* * * * *